US009401867B2

(12) United States Patent
Wang et al.

(10) Patent No.: US 9,401,867 B2
(45) Date of Patent: Jul. 26, 2016

(54) METHOD OF HANDLING TRANSMISSION OF DATA TO A MOBILE DEVICE THROUGH MULTIPLE CHANNELS

(75) Inventors: Xin Wang, Morris Plains, NJ (US); Yang Yang, Morris Plains, NJ (US)

(73) Assignee: Alcatel Lucent, Boulogne-Billiancourt (FR)

( * ) Notice: Subject to any disclaimer, the term of this patent is extended or adjusted under 35 U.S.C. 154(b) by 1457 days.

(21) Appl. No.: 12/318,926

(22) Filed: Jan. 13, 2009

(65) Prior Publication Data

US 2010/0177706 A1    Jul. 15, 2010

(51) Int. Cl.

| | |
|---|---|
| *H04W 4/00* | (2009.01) |
| *H04L 12/28* | (2006.01) |
| *H04L 12/56* | (2006.01) |
| *H04L 12/801* | (2013.01) |
| *H04L 12/803* | (2013.01) |
| *H04W 24/00* | (2009.01) |
| *H04W 28/14* | (2009.01) |
| *H04W 48/16* | (2009.01) |

(52) U.S. Cl.
CPC .............. *H04L 47/10* (2013.01); *H04L 47/125* (2013.01); *H04L 47/14* (2013.01); *H04W 24/00* (2013.01); *H04W 28/14* (2013.01); *H04W 48/16* (2013.01)

(58) Field of Classification Search
CPC ....... H04L 47/10; H04L 47/14; H04L 47/125; H04L 47/127; H04W 24/00; H04W 28/14; H04W 48/16
USPC .......................................... 370/328, 329, 412
See application file for complete search history.

(56) References Cited

U.S. PATENT DOCUMENTS

| | | | |
|---|---|---|---|
| 7,707,303 B2 * | 4/2010 | Albers et al. ................... | 709/231 |
| 2003/0133427 A1 * | 7/2003 | Cimini et al. .................. | 370/338 |
| 2007/0008934 A1 * | 1/2007 | Balasubramanian et al. | 370/335 |
| 2007/0253425 A1 * | 11/2007 | Hamilton et al. .......... | 370/395.4 |
| 2008/0259863 A1 * | 10/2008 | Zhang et al. .................. | 370/329 |
| 2009/0161543 A1 * | 6/2009 | Beadle .......................... | 370/232 |

* cited by examiner

*Primary Examiner* — Derrick Ferris
*Assistant Examiner* — Farhad Ali
(74) *Attorney, Agent, or Firm* — Harness, Dickey & Pierce, P.L.C.

(57) ABSTRACT

Example embodiments provide methods of handling transmission of data to a mobile device through multiple channels. One example embodiment includes receiving carrier capacity values from each of a plurality of carrier controllers providing communication for a mobile device over corresponding channels, the carrier capacity values being an estimate of the number of bytes that the carrier controller can send to the mobile device on time; receiving data for the mobile device; and sending the data to the plurality of carrier controllers, the amount of the data sent to each of the carrier controllers being based on the carrier capacity value received from each of the plurality of carrier controllers.

16 Claims, 3 Drawing Sheets

METHOD OF HANDLING TRANSMISSION OF DATA TO A MOBILE DEVICE THROUGH MULTIPLE CHANNELS

BACKGROUND OF THE INVENTION

1. Field

Example embodiments of the present invention relate generally to wireless networks and handling transmission of data to a mobile device in a wireless network through multiple channels.

2. Description of the Related Art

Advanced wireless data systems such as EVDO Rev. B allow a single user to access multiple data channels in order to improve user performance. With Multi-Link PPP, an application stream is sent to a user over multiple channels. Upper layer packets of the application stream are fragmented or concatenated as necessary, encapsulated in lower layer packets, and sent over selected channels. At the receiver end, the lower layer packets are processed and the upper layer packets are recovered from one or more lower layer packets. The use of multiple data channels allows a wireless system to maximize efficiency with respect to bandwidth usage when sending data to receivers.

In a wireless system, a packet dispatcher can be used to send data packets of an application stream to the user through multiple channels. The multiple channels through which the data packets are sent to the user are independent from one another and may each experience substantially different loading conditions from one another at any given time. Sending data packets to the user through heavily loaded channels results in significant delays for the data packets. These delays result in reduced performance for the user and the wireless system in general.

SUMMARY OF THE INVENTION

The present invention relates to a method of handling transmission of data to a mobile device through multiple channels.

In one embodiment, carrier capacity values are determined for each of a plurality of channels providing communication for a mobile device. The carrier capacity values are determined as a function of channel transmission rate and a timer value of the mobile device. Data for the mobile device is received and sent to the plurality of channels. The amount of the data sent to each of the channels is based on the determined carrier capacity values.

In another embodiment, capacity information is provided to a packet switcher to facilitate the transmission of data through multiple channels. Carrier capacity values are determined as a function of channel transmission rate and a timer value associated with a mobile device, and made available to a Radio Network Controller (RNC). Data for the mobile device is received from the RNC, in amounts generally proportional to per-channel carrier capacity values.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
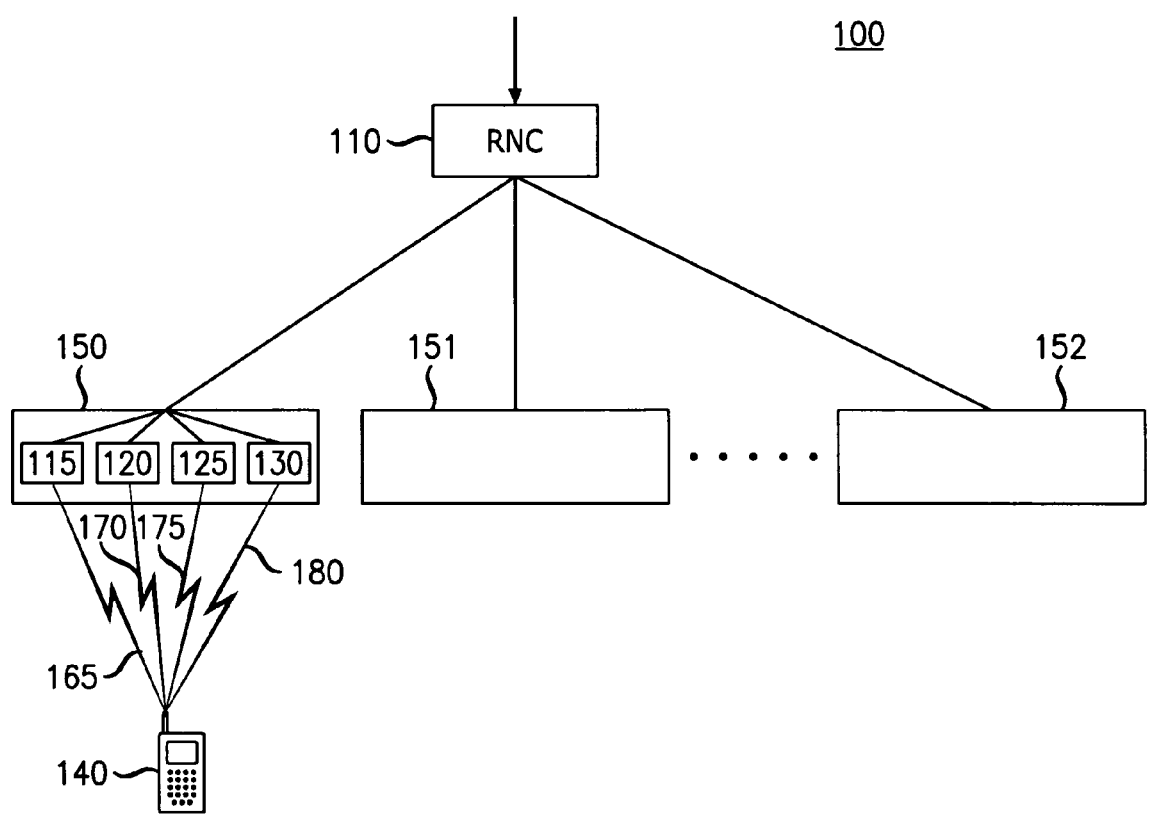
FIG. 1 is a diagram illustrating a portion of a wireless system following an EV-DO protocol.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "mobile" may be considered synonymous to, and may hereafter be occasionally referred to, as a mobile unit, mobile station, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS), NodeB, extended Node B, femto cell, access point, etc. and may describe equipment that provides the radio baseband functions for data and/or voice connectivity between a network and one or more users. The term "carrier" may be considered synonymous to and/or referred to as a channel.

FIG. 1 illustrates a portion of a wireless system 100 following an EV-DO protocol. Referring to FIG. 1, wireless system 100 may include a Radio Network Controller (RNC) 110 connected to a plurality of base stations 150~152. Though three base stations are illustrated, the RNC 110 may be connected to any number of base stations.

Base stations 150~152 may each support a plurality of channels via a plurality of corresponding carrier controllers. First base station 150 includes first through fourth carrier controllers 115, 120, 125 and 130, which handle such multiple channels as represented by channels 165, 170, 175 and 180, respectively. Illustratively, first through fourth channels 165~180 are used to support wireless communication between base station 150 and mobile device 140. While only the four channels and carrier controllers of base station 150 are illustrated, it will be understood that base stations 151~152 may also include a plurality of carrier controllers configured to support pluralities of channels, such as first through fourth channels 165~180. Further, it should be understood that the four channels and controllers shown for base station 150 are merely illustrative, and should in no sense be construed as limiting the number of channels served by a given base station.

The RNC 110 may receive data for the mobile device 140 from a number of sources including, for example, another RNC, a Public Data Network (PDN), or the internet. The data received by the RNC 110 may be in the form of an application data stream established between another device and mobile device 140. The RNC 110 operates to dispatch the received data to the mobile device 140 in the form of multiple data packets, which may be dispatched to the mobile device 140 through multiple paths or channels, such as channels 165~180.

The channels 165~180 are each independent from one another. Each of the channels 165~180 may be associated with a different path through which data may be sent to and received from mobile devices. The channels 165~180 may be 1.25 MHz carriers—for example, the 1.25 MHz channels used with the CDMA2000 and EV-DO protocols.

In addition to the illustrated case of carrier controllers 115~130 operating to handle wireless communication for the mobile device 140, via channels 165~180, such carrier controllers 115~130 may each be used to handle wireless communication for a number of other mobile devices (not shown) that are in communication with base station 150 through channels 165~180. Thus, the carrier controllers 115-130 may each be used to provide wireless communication for different numbers of mobile devices. Accordingly, at any given time, the carrier controllers 115~130 may have different loading conditions. For example, carrier controller 115 of FIG. 1 may experience a substantial amount of traffic from mobile devices communicating with base station 150 through channel 165. The heavy traffic load on channel 165 may reduce the rate at which data packets can be sent to the mobile device 140 from carrier controller 115 via channel 165.

Each of the carrier controllers 115~130 may include a buffer for storing data packets that are to be sent to mobile devices for which the channels 165~180 are providing wireless communication.

As previously described, the mobile device 140 is capable of receiving data packets through multiple channels such as channels 165~180. Data packets sent to the mobile device 140 through the multiple channels may be received by the mobile device 140 at different times and out of order. The mobile device 140 rebuilds data from data packets that are received out of order and may include an internal buffer for storing received packets. To improve the efficiency of the data storage and rebuilding functions, the mobile device 140 also includes an internal timer to govern the amount of time the mobile device 140 waits to receive an out of order packet. If the amount of time allotted to receive a missing packet expires before the packet is received, the mobile device 140 will assume the missing packet is lost and send a retransmission request for the base station to resend the missing packet.

The mobile device 140 will assume a missing packet is lost in the case of the RNC 110 routing a data packet through a given channel for delivery to the mobile device, but the data packet stays in the associated carrier controller buffer due to channel loading for an amount of time that exceeds the amount of time allotted for receipt of a missing packet by the internal timer in the mobile device. As indicated above, for this case, the mobile device 140 will send a retransmission request for the missing packet even though the missing packet was not lost, but rather became delayed in the carrier controller.

Being forced to send a retransmission request will result in significant delay in the ultimate receipt by the mobile device of the data in the missing packet via a re-sent packet. Additionally, the retransmission request and the re-sent data packet each constitute extra traffic and extra loading on wireless system 100 that would not be necessary if the original missing packet had been delivered to the mobile device within the relevant time-out window.

Figure 2:
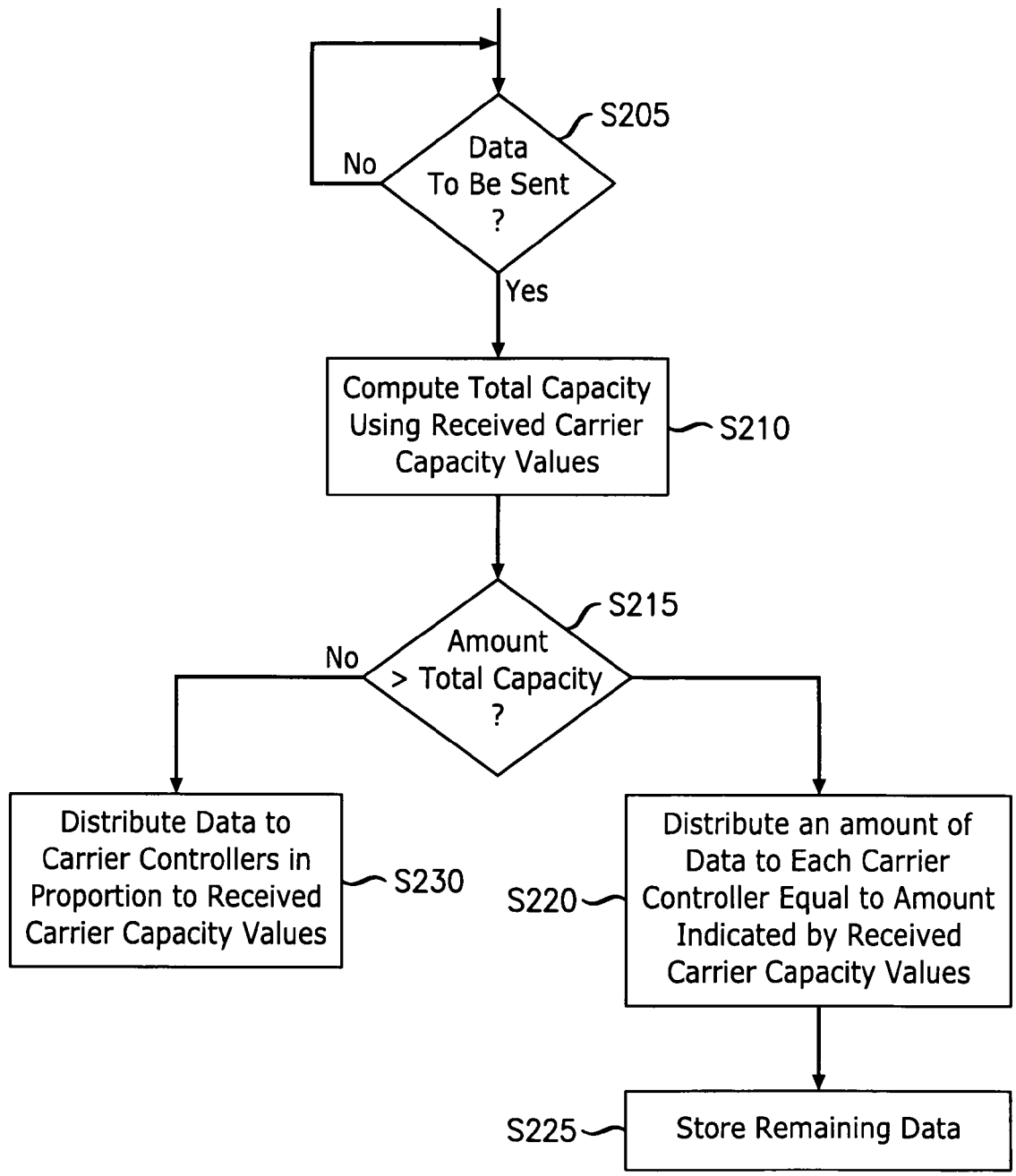
FIG. 2 is a flow chart illustrating a method of sending data to a mobile device through multiple channels according to an embodiment.

FIG. 2 is a flow chart illustrating a method of sending data to a mobile device through multiple carrier channels according to an embodiment of the invention. The method of sending data to a mobile device through multiple carriers will be described with reference to the RNC 110, the base station 150 and the mobile device 140 of wireless system 100 in FIG. 1.

As indicated above in conjunction with FIG. 1, the RNC 110 may periodically receive data for the mobile device 140 and store that data. That operation is indicated at step S305 of FIG. 2, where the RNC 110 checks to see if data exists for the mobile device 140. If the RNC 110 has no data for mobile device 140, the RNC continues to wait for data. If the RNC 110 does have data for the mobile device 140, the RNC 110 proceeds to operation S210.

In operation S210, the RNC 110 computes a total capacity for all channels allocated for serving mobile device 140 (illustratively, channels 165~180) based on channel capacity values received from each of the associated carrier controllers (e.g., carrier controllers 115~130). Computation of the total capacity of the channels may be accomplished by summing the channel capacity values received from each of the allocated carrier controllers, or by other known algebraic operations. Channel capacity values may be sent periodically from the allocated carrier controllers to the RNC 110 in a feedback loop. The carrier capacity values may be expressed in terms of bytes or other capacity measures. The carrier capacity values are an indication of the capacity of each the allocated carrier controllers to handle packets for a served mobile device via associated channels. For example, a carrier capacity value sent by the first carrier controller 115 is an estimate of the amount of data that can be accepted by the first carrier controller 115 and transmitted via the first channel 165 to the mobile 140 without exceeding the buffer-loading time constraints of the mobile device 140 for any of the data. The determination of individual carrier capacity values will be described in further detail below in conjunction with FIG. 3.

With reference again to FIG. 2 and particularly operation S215, the RNC compares the amount of data it has to send to mobile device 140 with the total capacity of the allocated carrier controllers calculated in operation S210. If the total amount of data to be sent to mobile device 140 exceeds the total capacity calculated in operation S210, the RNC 110 proceeds to operation S220.

In operation S220, the RNC 110 buffers that portion of the received data that exceeds the total calculated capacity for the allocated carrier controllers and distributes the remaining data among those allocated controllers in respective amounts that equals or substantially equals the carrier capacity values received for each of the allocated carrier controllers. For example, if the RNC 110 has 500 bytes of data to send to the mobile device 140, and carrier capacity values are sent to the RNC 110 indicating that each of the allocated carrier controllers can handle 100 bytes, respectively, the RNC 110 will send only 100 bytes to each of the allocated carrier controllers. The RNC 110 will buffer the remaining 100 bytes until it receives a carrier capacity value from at least one of the allocated carrier controllers indicating the carrier controller has additional capacity to handle data packets for the mobile device 140. Accordingly, the RNC 110 will not send more data to a carrier controller than the carrier capacity value received from that carrier controller.

Referring again to operation S215, if the total amount of data to be sent to mobile device 140 does not exceed the total capacity calculated in operation S210, the RNC 110 proceeds to operation S230.

In operation S230, the RNC 110 sends an amount of data to each of the allocated carrier controllers that is proportional to the carrier capacity values received from each of those carrier controllers. Illustratively, if the total amount of data to be sent to mobile device 140 does not exceed the total capacity calculated in operation S210, the amount of data sent to a carrier controller 'n' may be calculated using the following algorithm:

$$Data(n) = (Capacity(n)/Total\_Capacity) * Total\_Data$$

where Data(n) is the amount of data to be sent to carrier controller 'n'; Capacity(n) is the carrier capacity value sent by carrier controller 'n' to the RNC 110; Total_Capacity is the total value of the carrier capacity values received by the RNC 110 for each of the carrier controllers; and Total_Data is the total amount of data to be sent to the mobile device 140 that is received by the RNC 110 for transmission to mobile device 140.

For example, if the RNC 110 has 100 bytes of data to send to the mobile device 140, and carrier capacity values for the carrier controllers 115~130 are received indicating the carrier controllers 115~130 can handle 20, 40, 60 and 80 bytes, respectively, total capacity will be 200 bytes, so each carrier controller will receive traffic equal to one-half (100/200) of its reported capacity. The RNC 110 will send 10 bytes to carrier controller 115 for channel 165, 20 bytes to carrier controller 120 for channel 170, 30 bytes to carrier controller 125 for channel 175, and 40 bytes to carrier controller 130 for channel 180.

Figure 3:
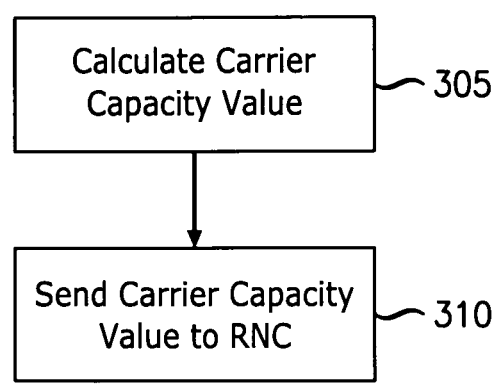
FIG. 3 is a flow chart illustrating a method of providing capacity information to a packet dispatcher according to an embodiment.

The determination of carrier capacity values for respective ones of the allocated carrier controllers, as applied in the methodology of FIG. 2, is illustrated in the flow chart of FIG. 3. The carrier capacity determination methodology will be described with respect to an example applied to carrier controller 115; however, it will be understood that this description is equally applicable to all controllers allocated for a given mobile.

In operation S305 of the FIG. 3 flow chart, a carrier capacity value may be calculated for a carrier controller, illustratively carrier controller 115, based on timer information associated with the mobile device 140 and a data rate for the associated carrier channel, illustratively, channel 165. The carrier capacity value may be calculated periodically by the carrier controller.

The timer information used by the carrier controller to calculate the carrier capacity value for the associated channel may be the amount of time the mobile device 140 waits for a missing packet before the mobile device 140 assumes the missing packet is lost and sends a retransmission request for the missing packet. The timer information may be fixed and pre-stored in the carrier controller, or it may be periodically changed by the mobile device 140, in which case, the new value would be sent to the associated carrier controller for use in calculating the carrier capacity value. Accordingly, if the internal timer of the mobile device 140 is configurable or variable, the carrier capacity value calculated by the associated carrier controller will automatically reflect the changes in the internal timer of the mobile device 140.

The data rate may be the rate at which data has been sent via the channel between the carrier controller (illustratively carrier controller) and the mobile device 140 over a recent window of time. The data rate may change dynamically as loading conditions change for the carrier controller. Accordingly, the carrier capacity value calculated by the carrier controller may be dynamically updated to reflect the changes in the data rate as such changes occur.

The carrier capacity value for a given channel may be calculated by multiplying the data rate for the channel by the mobile timer information. For example, the following algorithm may be used:

$$Capacity(n) = User\_Transmission\_Rate(n) * Receiver\_Timer$$

where Capacity(n) is a carrier capacity value calculated for a channel 'n'; User_Transmission_Rate(n) is the rate (or a close approximation of such rate) at which data is being sent through the channel 'n' to the mobile device 140; and Receiver_Timer is the amount of time the mobile device 140 will wait for a data packet before assuming the data packet is lost and, depending on the application with which the data packet is associated, possibly sending a retransmission request for the data packet. For example, using the algorithm above, if the mobile device 140 has a timer value of 10 ms and data is being sent from carrier controller 115 through channel 165 at a rate of 100 bytes/ms, the carrier capacity value for channel 165 will be 1000 bytes. This value is useful as an indicator of the maximum amount of data that can be accepted by carrier controller 115 for transmission via channel 165 to the mobile device 140. Unless there is an increase in the rate at which data can be sent through channel 165 to the mobile device 140, there is a significant chance that data in excess of 1000 bytes will not be received by the mobile device 140 within the 10 ms timer window and that data will be regarded by the mobile 140 as lost.

In operation S310, the carrier capacity value calculated by carrier controller 115 is sent to the RNC 110. As is described above with respect to operation S305, the calculated carrier capacity value reflects changes taking place in the configuration of the mobile device as well as the loading conditions of carrier channel 165. Accordingly, the carrier capacity value determined by carrier controller 115 provides the RNC 110 with an estimation of the amount of data that channel 165 can handle for the mobile device 140 based on current conditions affecting channel 165 and the mobile device 140.

The methods described above with reference to FIGS. 2 and 3 enable carrier capacity values to be provided from linked carrier controllers (illustrated as carrier controllers 115–130) to the RNC 110. The RNC 110 can use the carrier capacity values to intelligently decide how much data to send to each of the linked carrier controllers for wireless transmission to the mobile device 140 via the channels associated with the linked carrier controllers. The occurrence of packet loss for mobile device 140 will be reduced, and, correspondingly, the added delay and network traffic that result from the need for the mobile device 140 to send retransmission requests to the network 105 and to receive re-sent packets will be reduced with concomitant increase in throughput and efficiency for the wireless system 100.

The invention being thus described, it will be obvious that the same may be varied in many ways. Such variations are not to be regarded as a departure from the invention, and all such modifications are intended to be included within the scope of the invention.

What is claimed:

1. A method comprising:
 receiving carrier capacity values from each of a plurality of carrier controllers providing communication with a mobile device over a corresponding plurality of channels, wherein for each of the plurality of carrier controllers the carrier capacity value received from that carrier controller includes an estimate of an amount of data the carrier controller is capable of sending to the mobile device without exceeding a first retransmission period of the mobile device;
 receiving data for the mobile device;
 sending a portion of the received data to each carrier controller of the plurality of carrier controllers such that an amount of the data sent to each carrier controller is based on the carrier capacity value associated with that carrier controller; and
 directing a new retransmission period to at least one carrier controller in response to the mobile device changing the first retransmission period to the new retransmission period,
 wherein the first and new retransmission periods are, respectively, previous and updated versions of a maximum waiting time associated with the mobile device, the maximum waiting time being an amount of time a packet has not been received before the mobile device determines the packet is lost.

2. The method of claim 1, wherein each carrier capacity value received from an associated one of the plurality of the plurality of carrier controllers is based on the maximum waiting time and a data rate of transmission by the associated carrier controller to the mobile device.

3. The method of claim 2, wherein the carrier capacity values sent from each carrier controller are calculated by multiplying the maximum waiting time by the data rate.

4. The method of claim 1, wherein the sending includes sending a number of bytes to each carrier controller that does not exceed the amount of data indicated by the carrier capacity value received from each carrier controller.

5. The method of claim 1, wherein the sending includes sending a number of bytes to each carrier controller that is proportional to the amount of data indicated by the carrier capacity value received from each carrier controller.

6. A method comprising:
 calculating a carrier capacity value, the carrier capacity value including an estimate of the number of bytes that a carrier controller is capable of sending to a mobile device without exceeding a first retransmission period of the mobile device;
 sending the carrier capacity value to a radio network controller (RNC); and
 receiving data from the RNC at the mobile device, an amount of the data being based on the carrier capacity value;
 receiving a new retransmission period when the mobile device changes the first retransmission period to the new retransmission period,
 wherein the first and new retransmission periods are, respectively, previous and updated versions of a maximum waiting time associated with the mobile device, the maximum waiting time being an amount of time a packet has not been received before the mobile device determines the packet is lost.

7. The method of claim 6, wherein the carrier capacity value is based on the maximum waiting time and a data rate of transmission by the carrier controller to the mobile device.

8. The method of claim 7, wherein the carrier capacity value is calculated by multiplying the maximum waiting time by the data rate.

9. The method of claim 6, wherein the maximum waiting time is received from the mobile device.

10. The method of claim 6, wherein the calculating includes calculating, at a base station, a plurality of carrier capacity values respectively corresponding to a plurality of carrier controllers included in the base station, each of the plurality of carrier capacity values including an estimate of the number of bytes that the corresponding carrier controller is capable of sending to the mobile device without exceeding the first retransmission period of the mobile device,
 wherein the sending includes sending the plurality of carrier capacity values, and
 wherein the amount of data received from the RNC is based on the plurality of carrier capacity values.

11. A system, comprising:
 a plurality of carrier controllers configured to provide communication with a mobile device over a corresponding plurality of channels; and
 a radio network controller (RNC) configured to:
  receive carrier capacity values from each of the plurality of carrier controllers, wherein for each of the plurality of carrier controllers the carrier capacity value received from that carrier controller includes an estimate of an amount of data the carrier controller is capable of sending to the mobile device without exceeding a first retransmission period of the mobile device;
  receive data for the mobile device; and
  send a portion of the received data to each carrier controller of the plurality of carrier controllers such that an amount of the data sent to each carrier controller is based on the carrier capacity value associated with that carrier controller, wherein the system is configured to direct a new retransmission period to at least one carrier controller in response to the mobile device changing the first retransmission period to the new retransmission period, wherein the first and new retransmission periods are, respectively, previous and updated versions of a maximum waiting time associated with the mobile device, the maximum waiting time being an amount of time a packet has not been received before the mobile device determines the packet is lost.

12. The system of claim 11, wherein each carrier capacity value received from the associated carrier controller is based on the maximum waiting time and a data rate of transmission by the associated carrier controller to the mobile device.

13. The system of claim 11, wherein the RNC is configured to send a number of bytes to each carrier controller that does not exceed the amount of data indicated by the carrier capacity value received from each carrier controller.

14. A carrier controller, comprising:
a transmitter configured to:
calculate a carrier capacity value, the carrier capacity value including an estimate of the number of bytes that the carrier controller is capable of sending to the mobile device without exceeding a first retransmission period of the mobile device, and
send the carrier capacity value to a radio network controller (RNC); and a receiver configured to:
receive data from the RNC, an amount of the received data being based on the carrier capacity value, and
receive a new retransmission period when the mobile device changes the first retransmission period to the new retransmission period,
wherein the first and new retransmission periods are, respectively, previous and updated versions of a maximum waiting time associated with the mobile device, the maximum waiting time being an amount of time a packet has not been received before the mobile device determines the packet is lost.

15. The carrier controller of claim 14, wherein the carrier capacity value is based on the maximum waiting time and a data rate of transmission by the carrier controller to the mobile device.

16. The carrier controller of claim 15, wherein the carrier capacity value is calculated by multiplying the maximum waiting time by the data rate.

* * * * *